June 9, 1959 R. E. HOLMEN ET AL 2,890,241
SYNTHESIS OF ACRYLATES FROM ALPHA-CHLOROPROPIONATES
Filed April 4, 1956
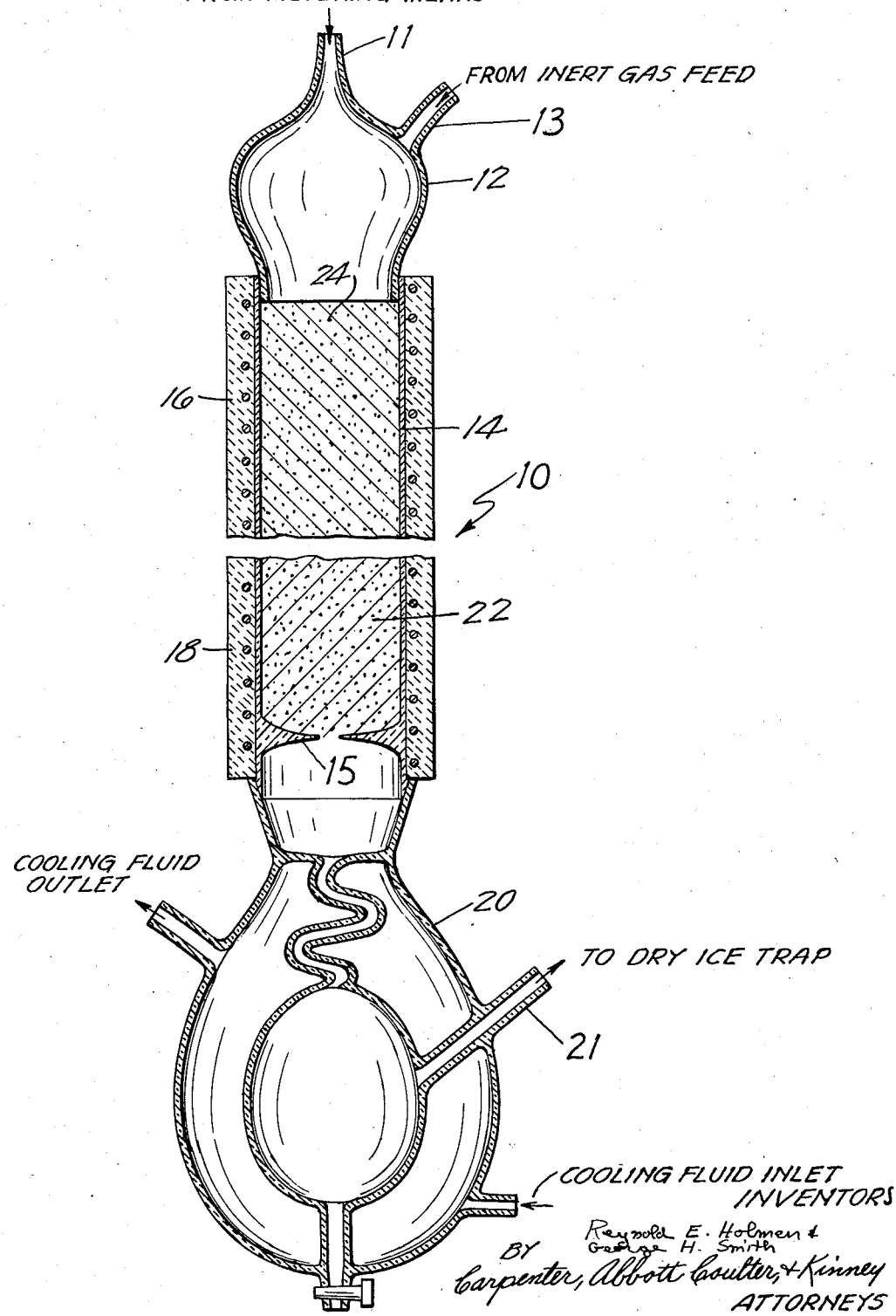

United States Patent Office 2,890,241
Patented June 9, 1959

2,890,241

SYNTHESIS OF ACRYLATES FROM ALPHA-CHLOROPROPIONATES

Reynold E. Holmen, White Bear Township, Ramsey County, and George H. Smith, New Canada Township, Ramsey County, Minn., assignors to Minnesota Mining & Manufacturing Company, St. Paul, Minn., a corporation of Delaware Application April 4, 1956, Serial No. 576,203

8 Claims. (Cl. 260—486)

The present invention relates to the preparation of acrylic acid and its lower alkyl esters, and more particularly relates to a process for the direct catalytic vapor phase dehydrochlorination of alpha-chloropropionic acid and its lower alkyl esters to acrylic acid and its corresponding esters.

The effectiveness of polyacrylates as rubber substitutes, and adhesives and coating ingredients has been long known. However, their large scale use in the fields mentioned, as well as other fields, has been limited and their commercial adoption has been delayed, due primarily to a lack of convenient and inexpensive methods for preparing acrylic acid and its esters.

One of the potentially most attractive materials, propionic acid, has not been readily utilized as a raw material for the preparation of acrylic acid and acrylic acid esters because of the fact that in the subsequent step of halogenation, generally chlorination, of the propionic acid, the alpha-chloro product ordinarily predominates almost to the exclusion of the beta-chloro product, from which latter material acrylic acid can easily be prepared. Even with a recently developed process for increasing the amount of beta-chlorination (U.S. Patent 2,682,504), the production of a significant amount of alpha-chlorinated material nevertheless occurs.

Unfortunately, heretofore, no satisfactorily convenient method for the direct conversion of alpha-chloripropionic acid to acrylic acid has been known; for example, one method disclosed for the production of acrylates from alpha-chloropropionates is to react the alpha-chloropropionate material with alcoholic ammonia for a period of time, then subject the reaction mixture to filtration and distillation steps to separate volatiles from the sludge of ammonium chloride and non-volatile byproducts. This process is described in U.S. Patent 2,500,005 issued to Richard O. Norris, March 7, 1950.

Accordingly, it is an important object of the present invention to provide a catalytic process for the direct conversion of alpha-chloro propionate materials to their corresponding acrylates, i.e., acrylic acid or the ester thereof corresponding to the starting propionate.

Another important object of the invention is in the provision of catalyst compositions which, when contacted with an alpha-chloropropionate material at elevated temperatures, convert a significant portion of the alpha-chloropropionate material to acrylic acid or the ester thereof corresponding to the starting propionate. A still further object is the provision of a new method for making beta-chloropropionic acid and its lower alkyl esters.

Other objects and advantages will become apparent as the description proceeds.

We have discovered a process for the direct dehydrohalogenation of alpha-chloropropionic acid and its lower alkyl esters to acrylic acid and its corresponding esters by contacting an alpha-chloropropionate material, by which is meant alpha-chloropropionic acid or a lower alkyl ester thereof, at an elevated temperature with a suitable dehydrochlorination catalyst. To be suitable, the catalyst, we have found, must be comprised of at least one of certain salts of metals from groups I and II of the periodic table, the oxides of which metals are more difficultly reducible than cadmium oxide, i.e., metals lying above cadmium, in the electromotive force series, as set fourth in Latimer and Hildebrand, "Reference Book of Inorganic Chemistry," pages 528–535, 3rd edition, 1951. The salts of such metals which we have found to show significant catalytic activity in our process are the halides, phosphates, and sulfates.

In carrying out the process constituting this invention, alpha-chloropropionic acid or one of its lower alkyl esters, wherein the alkyl radical is no greater than 4 carbons in length and is preferably methyl, is contacted with a metal salt catalyst of the type specified hereinbefore in a reaction zone at a temperature of from 300–650° C. Following the required contact with the catalytic material, the resulting effluent is condensed and fractionally distilled to yield acrylic acid or the acrylic acid ester corresponding to the starting alpha-chloropropionate. Preferably catalysts have been found to be the tribasic magnesium, calcium, strontium and barium phosphates, the magnesium, calcium, strontium, zinc, and barium sulfates, and the corresponding halides, particularly the chlorides and fluorides. As will be noted, these preferred catalysts are salts of group II metals of the periodic table having atomic numbers greater than 11 and less than 57, e.g. magnesium has an atomic number of 12, barium an atomic number of 56, and the remaining metals have atomic numbers falling therebetween.

One manner of carrying out the process of this invention will now be described in conjunction with the accompanying drawing wherein:

Fig. 1 illustrates in cross section and with parts broken away for clarity of detail a suitable apparatus for carrying out the process of the present invention.

Referring now to the accompanying drawing in more detail, the apparatus is designated in its entirety by the numeral 10. Metering means, such as a dropping funnel, syringe, pump, or the like (not shown) for feeding the alpha-chloropropionate material to the apparatus 10 is provided, and opens through the inlet 11 of the adaptor 12. The adaptor 12 in turn opens into the upper end of a vertical tube or column 14 surrounded over the upper and lower portions of its length by heating jackets 16 and 18 respectively. The lower end of the column 14 opens into a water cooled combination condenser and receiver 20, the cooling fluid inlet and outlet of the condenser being designated as such on the drawing. To condense more volatile products not condensed in the receiver, an outlet line 21 leads from the receiver to a Dry Ice trap (not shown) as indicated on the drawing.

Within the interior thereof, the column 14 is provided with supports at vertically spaced intervals which may be inwardly projecting detents 15 formed from the inside wall of the column, or other means such as supporting screens or the like. The function of the supports, or supporting detents 15 as shown, is to support the catalyst bed 22 in the lower portion of the column, and, optionally, the inert packing 24 in the upper portion of the column. The inert packing 24 in the upper section of the column 14 is to convert this section to a preheating section, acting in conjunction with the upper heating jacket 16 to preheat, and preferably vaporize, the alpha-chloropropionate material passing downwardly through the column 14 prior to contact of material and catalyst and thereby avoid undesirable, sharp temperature gradients in the catalyst bed 22. To prevent contamination of the column, as well as to generate a current through the column 14, an inert gas may be fed to the column through the adaptor inlet 13. While illustrated as a section of column 14, the preheating section may obviously be a separate piece of apparatus, the drawing in the present instance being merely an aid to understanding the method.

The construction materials of the apparatus are critical only to the extent that they be capable of withstanding moderate heat and attack by alpha-chloropropionic acid, HCl, and acrylic acid at moderately high temperatures. In the specific examples which follow "Pyrex" glass apparatus was utilized.

A convenient set of operating temperatures has been found to be from 200–350° C. in the pre-heating section or pre-reaction zone, and from 300–650° C. in the reaction zone containing the catalytic material. A preferable range of operating temperatures is approximately 250° C. in the pre-reaction zone and about 400° C. in the reaction zone itself. When a temperature above 500° C. is maintained in the reaction zone, a sharp reduction in yield of acrylic acid material usually results. The temperatures, however, will vary with the catalyst, it being necessary only that the temperature be sufficiently high to vaporize the starting material and promote the reaction; temperatures which cause thermal decomposition of either the catalyst or the alpha-chloropropionate material should, of course, be avoided.

The alpha-chloropropionate material is fed from the dropping funnel at a rate which provides sufficient contact with the heated catalyst to promote the desired dehydrohalogenation. A convenient rate of feed of alpha-chloropropionate material when the pre-reaction zone and the reaction zone are maintained at the preferred temperatures noted in the foregoing paragraph has been found to be from .1–1.5 kilograms/hr. per liter of catalyst. Faster or slower rates of feed may be utilized, and, in general a decrease in contact time is desirably accompanied by an increase in the temperature of the reaction zone containing the catalyst bed. As noted in the preceding paragraph, the chief limiting factors to moving indefinitely in the direction of shorter contact times and higher temperatures are the instability of the catalyst at the higher temperatures and the tendency for undesirable thermal cracking reactions to increase with higher temperatures. Generally the maximum practical operating temperature for a given catalyst, insofar as structural stability is concerned, may be most easily ascertained empirically by a series of blank runs at increasing temperatures, using water or HCl as a feed and measuring the activity of the catalyst after each run.

The catalysts are best prepared from finely divided and/or freshly precipitated materials in such a manner that the maximum available surface area per unit volume of catalyst is obtained. Substances which are insoluble or only very slightly soluble in water and which are in addition sufficiently cohesive are conveniently made into a stiff paste pelleted by extrusion, or dried in thin sheets, then broken into granules, the proper size of which may then be selected by screening. Examples of such compositions are $CaSO_4 \cdot 2H_2O$, $Ca_3(PO_4)_2$ and $Ba_3(PO_4)_2$. We have found that of those catalysts capable of existing in more than one crystallographic system, the cubic and rhombic forms provide generally more active catalysts than those of other systems.

Example 1

Using a dropping funnel, a preheating tube filled with inert glass helices and maintained at approximately 250° C., a catalyst tube maintained at approximately 400° C., a water cooled condenser and receiver and a Dry Ice cooled trap for volatiles not condensed in the water cooled condensor, 56.4 grams of alpha-chloropropionic acid were contacted at an average feed rate of 24.2 grams/hr. with 21 ml. of a catalyst (6–10 mesh) prepared from precipitated $Ca_3(PO_4)_2$ (U.S.P. grade) and forming a bed three inches deep.

Fractionation of the condensate yielded 3.2 grams of foreshots, or foreruns, boiling at from 46–88° C., a fraction boiling from 62–97° C. at 107 mm. Hg, containing 11.7 grams of acrylic acid, and 3.4 grams of unreacted alpha-chloropropionic acid, and a higher boiling fraction (113–140°C. at 78 mm. Hg) of 8.9 grams of beta-chloropropionic acid. Since the beta-chloropropionic acid, resulting undoubtedly from contact of acrylic acid with free HCl, may be practically quantitatively converted to acrylic acid by already known methods, the total conversion consisting of acrylic acid plus beta-chloropropionic acid, was 47% and the yield, based upon the alpha-chloropropionic acid consumed, was 50%.

Example 2

The procedure of Example 1 was repeated with pelleted $BaCl_2$ as the catalyst in the catalyst tube. Fractionation of the product gave foreshots of 3 grams at temperatures to 100° C. The amounts of acrylic acid, unconverted alpha-chloropropionic acid and beta-chloropropionic acid recovered were 9.3 grams, 15.4 grams, and 8.3 grams respectively. The conversion and yield percentages for the combined acrylic acid and beta-chloropropionic acid were 39.4% conversion, 54.8% yield.

Another run over $BaCl_2$ gave a 76% yield.

Example 3

The procedure of Example 1 was repeated with a 6–10 mesh granular catalyst of precipitated $Ba_3(PO_4)_2$. Upon fractional distillation of the crude condensate, 12.2 grams of acrylic acid and 6.4 grams of unreacted alpha-chloropropionic acid were obtained at 75–100° C. at 100 mm. of Hg, and 8.2 grams of beta-chloropropionic acid were obtained at 142–150° C. at 100 mm. of Hg. The conversion and yield figures of the combined beta-chloropropionic acid and acrylic acid were respectively 47.3% and 53.2%.

A similar run over $Ba_3(PO_4)_2$ resulted in conversion and yield figures of 50.7 and 55.2% respectively.

Many other runs utilizing a variety of catalysts have been made; some of these runs, and the conversion and yield percentages, calculated as in Examples 1–3 are given in the table following.

Where second and third components of mixed catalyst compositions are noted in the following table, such components are used in amounts of approximately 1 mole per 25 mols of first, or major, component except where otherwise specified. By catalysts "promoted with" in the table is meant that the activity of the major catalyst is enhanced by the second component or second and third components with which it is promoted. Although the promoting components may or may not themselves be catalysts for the dehydrohalogenation reaction, their primary function is to exert a synergistic effect on the catalyst promoted thereby.

| Catalyst | Catalyst Abbreviation | Percent Conversion | Percent Yield |
|---|---|---|---|
| Tribasic magnesium Phosphate $Mg_3(PO_4)_2$ | $Mg_3(PO_4)_2$ | 42-6 | 51.7 |
| Calcium sulfate promoted with $LaPO_4$ and $CsH_2PO_4$ | $CaSO_4$ | 60 | 62.5 |
| Calcium pyrophosphate promoted with $LaPO_4$ and $CsH_2PO_4$ | $Ca_4P_2O_7$ | 34 | 42 |
| Calcium chloride promoted with $LaPO_4$ and $CsH_2PO_4$ | $CaCl_2$ | 29 | 36 |
| Calcium sulfate promoted with $BaTiO_3$ and $CsH_2PO_4$ | $CaSO_4$ | 53.5 | 59 |
| Calcium sulfate promoted with $CsRbHPO_4$ | $CaSO_4$ | 60 | 63 |
| Calcium sulfate promoted with $CsPO_3$, $CePO_4$, $Rb_2SO_4$, or $Th_3(PO_4)_4$ | $CaSO_4$ | 60-67 | 64-70 |
| Tribasic calcium phosphate promoted with calcium chloride | $Ca_3(PO_4)_2$ | 49 | 52 |
| Calcium sulfate promoted with lithium sulfate | $CaSO_4$ | 55 | 60 |
| Calcium sulfate promoted with strontium sulfate (1:0.1 molar ratio) | $CaSO_4+SrSO_4$ | 60 | 68 |
| Calcium sulfate | $CaSO_4$ | 49 | 58 |
| Zinc chloride on silica gel support | $ZnCl_2$ | 40.6 | 43.2 |
| Barium sulfate | $BaSO_4$ | 58 | 60 |
| Calcium sulfate promoted with cerous sulfate | $CaSO_4$ | 41 | 56 |
| Calcium sulfate promoted with $KPO_3$ | $CaSO_4$ | 60 | 64 |
| Barium fluoride | $BaF_2$ | 57 | 59 |
| Calcium sulfate promoted with sodium chloride | $SrSO_4$ | 51 | 58 |
| Calcium sulfate promoted with barium chloride | $CaSO_4$ | 54.4 | 57 |

Catalytic activity appears to decrease in the direction from tribasic phosphates to monobasic phosphates. For example, tribasic calcium phosphate, when used as the catalyst bed, provided yields on the order of 50%; calcium pyrophosphate, on the other hand, provided yields on the order of 40% whereas $Ca(PO_3)_2$ gave negligible conversion to acrylic acid and only 4% conversion to beta-chloropropionic acid.

*Example 4*

A typical recipe of a catalyst prepared for use in the process of this invention is set forth below:

Parts by weight
$BaCl_2 \cdot 2H_2O$ -------------------------------- 73.2
$(NH_4)_2HPO_4$ -------------------------------- 26.4

Each compound was dissolved separately in 200 ml. distilled water. The $(NH_4)_2HPO_4$ solution was additionally made strongly ammoniacal before the solution of $BaCl_2$ was added thereto with stirring. The precipitate of tribasic barium phosphate, called $Ba_3(PO_4)_2$, was collected on a filter and washed free of chlorine ions before being spread out in a thin layer on glass (or tin) to dry. The dried cake was broken up and the 6-10 mesh granules collected for use.

An example of "promoted" catalyst preparation is as follows:

*Example 5*

In 75 ml. of water was dissolved 3.7 g. $LaCl_3 \cdot 2H_2O$ (0.01 M) after which 36 g. (¼ M) of finely divided $CaSO_4 \cdot \frac{1}{2}H_2O$ (from pptd. $CaSO_4 \cdot 2H_2O$) was stirrred in. To the pasty slurry was added 1.45 g. of 85% $H_3PO_4$ in 10 ml. of water. After thorough mixing the slurry was filtered, washed free of chlorine ions, spread out to dry at approximately 138° C. and then granulated. Particles of 6-10 mesh size were saved for use. Other sizes may be more desirable for a particular apparatus and catalyst composition.

In a similar manner to Example 5, a granular catalyst was prepared from $CeCl_3 \cdot 7H_2O$, $CaSO_4 \cdot 2H_2O$ and $H_3PO_4$.

If an additional soluble promoter, such as $KPO_3$, is to be used, this should, of course, usually be added after the precipitation of the insoluble promoter onto the catalyst mass and after unwanted ions are washed out.

It is to be understood that the examples are illustrative only and not meant to be definitive of the invention. Thus, methyl alpha-chloropropionate, when passed over a catalyst in the manner of Examples 1–3, provides an excellent yield of methyl acrylate. Likewise, other lower alkyl esters, may provide good yields of the corresponding acrylates.

From the foregoing description, the process constituting the invention will be readily apparent. However, since numerous minor modifications and changes from the detailed description will probably occur to those skilled in the art, it is desired to limit the invention only as required in the appended claims.

We claim:

1. The method which comprises contacting an alpha-chloropropionate material selected from the group consisting of alpha-chloropropionic acid and a lower alkyl ester thereof with a catalyst comprising at least one salt selected from the group consisting of sulfates, phosphates, and halides, of a group II metal of the periodic table having an atomic number greater than 11 and less than 57 and lying above cadmium in the electromotive series, at a temperature of from 300–650° C., and recovering from the reaction product the acrylate corresponding to the starting propionate.

2. The method of claim 1 wherein the temperature is approximately 400° C.

3. A method for the direct, catalytic conversion of alpha-chloropropionate materials represented by the formula

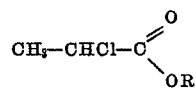

wherein R is a member selected from the group consisting of hydrogen and a lower alkyl radical, into the acrylate corresponding thereto; the method comprising contacting the alpha-chloropropionate material in vapor form with a catalyst comprising at least one salt selected from the group consisting of phosphates, sulfates, and halides, of a metal selected from group II of the periodic table having an atomic number greater than 11 and less than 57 and lying above cadmium in the electromotive series, in a reaction zone maintained at a temperature of from 300–500° C., condensing the catalyzed vapor in a post reaction zone and recovering the acrylate from the condensate.

4. A method for converting alpha-chloropropionic acid to acrylic acid which comprises contacting alpha-chloropropionic acid with a catalyst comprising at least one salt selected from the group consisting of phosphate, sulfate, and halide salts, of those group II metals of the periodic table having atomic numbers greater than 11 and less than 57 and lying above cadmium in the electromotive force series, the contact being carried out in a reaction zone maintained at a temperature from 300–500° C. and recovering acrylic acid from the catalyst contacted vapor in a post reaction zone.

5. The method of claim 4 wherein the temperature is maintained at approximately 400° C.

6. A method for converting alpha-chloropropionic acid to acrylic acid which comprises contacting alpha-chloropropionic acid with a catalyst selected from the group consisting of the tribasic phosphates and the sulfates, chlorides, and fluorides of magnesium, zinc, calcium, strontium, and barium in a reaction zone maintained in a temperature range of from 300–500° C. condensing the effluent in a post reaction zone, then recovering beta-chloropropionic acid and acrylic acid from the condensate.

7. The method of claim 6 wherein the alpha-chloropropionic acid is vaporized in a pre-reaction zone at a temperature of from 200–300° C. prior to contact with the catalyst.

8. A method for the direct, catalytic conversion of an alpha-chloropropionate material selected from the group consisting of alpha-chloropropionic acid and a lower alkyl ester thereof to the corresponding beta-chloropropionate material, said method comprising contacting said alpha-chloropropionate material in the vapor phase and at a temperature range of from about 300 to about 650° C. with a catalyst, said catalyst being selected from the group consisting of the sulphates, phosphates and halides of those metals occurring in group II of the periodic table having an atomic number greater than 11 and less than 57 and lying above cadmium in the electromotive force series, condensing the catalyzed vapor and removing the beta-chloropropionate material formed from the condensate.

References Cited in the file of this patent

UNITED STATES PATENTS

| | | |
|---|---|---|
| 2,013,648 | Barrett | Sept. 10, 1935 |
| 2,385,549 | Spence | Sept. 25, 1945 |
| 2,500,005 | Norris | Mar. 7, 1950 |
| 2,769,835 | Kosmin et al. | Nov. 6, 1956 |

UNITED STATES PATENT OFFICE

CERTIFICATE OF CORRECTION

Patent No. 2,890,241                                              June 9, 1959

Reynold E. Holmen et al.

It is hereby certified that error appears in the printed specification of the above numbered patent requiring correction and that the said Letters Patent should read as corrected below.

Column 4, line 26, for "(113–140° C. at 78 mm. Hg)" read -- (133–140° C. at 78 mm. Hg) --.

Signed and sealed this 15th day of March 1960.

(SEAL)
Attest:

KARL H. AXLINE                                             ROBERT C. WATSON
Attesting Officer                                        Commissioner of Patents